United States Patent
Dede et al.

(10) Patent No.: US 11,374,273 B2
(45) Date of Patent: Jun. 28, 2022

(54) THERMAL MANAGEMENT SYSTEMS INCLUDING MULTIPLE PHASE CHANGING MATERIALS AND VEHICLES INCLUDING THE SAME

(71) Applicant: Toyota Motor Engineering & Manufacturing North America, Inc., Plano, TX (US)

(72) Inventors: Ercan Mehmet Dede, Ann Arbor, MI (US); Shailesh N. Joshi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 66 days.

(21) Appl. No.: 16/176,799

(22) Filed: Oct. 31, 2018

(65) Prior Publication Data

US 2020/0136209 A1    Apr. 30, 2020

(51) Int. Cl.
| | |
|---|---|
| *H01M 10/659* | (2014.01) |
| *H01M 10/625* | (2014.01) |
| *H01M 10/613* | (2014.01) |
| *B60L 58/26* | (2019.01) |
| *H01M 10/6553* | (2014.01) |

(52) U.S. Cl.
CPC ........... *H01M 10/659* (2015.04); *B60L 58/26* (2019.02); *H01M 10/613* (2015.04); *H01M 10/625* (2015.04); *H01M 10/6553* (2015.04)

(58) Field of Classification Search
CPC .......................... H01M 10/613; H01M 10/625
See application file for complete search history.

(56) References Cited

U.S. PATENT DOCUMENTS

| | | | | |
|---|---|---|---|---|
| 2010/0273041 A1* | 10/2010 | Lawall | ............... | H01M 2/1072 |
| | | | | 429/120 |
| 2012/0258337 A1* | 10/2012 | Wang | ................. | H01M 10/613 |
| | | | | 429/50 |
| 2014/0079978 A1* | 3/2014 | Al-Hallaj | ........... | H01M 10/625 |
| | | | | 429/120 |

FOREIGN PATENT DOCUMENTS

| | | |
|---|---|---|
| CN | 102181270 A | 9/2011 |
| CN | 106602171 A | 4/2017 |
| DE | 102010055600 A1 | 6/2012 |
| WO | 2011072988 A1 | 12/2009 |
| WO | WO-2018060604 A1 * | 4/2018 ........ H01M 10/6568 |

OTHER PUBLICATIONS

WO-2018060604-A1 English machine translation (Year: 2021).*

(Continued)

*Primary Examiner* — Ula C Ruddock
*Assistant Examiner* — Armindo Carvalho, Jr.
(74) *Attorney, Agent, or Firm* — Dinsmore & Shohl LLP

(57) ABSTRACT

A battery module including a battery cell and a thermal management system for removing heat from the battery cell. The thermal management system includes two or more unit cells in an array. Each unit cell includes a primary shell comprising a primary phase change material (PCM), and a secondary shell comprising a secondary PCM that is thermally coupled to the primary shell. The battery cell is thermally coupled to the primary shell at a heat transfer interface and the secondary shells of adjacent unit cells in the array are separate.

20 Claims, 5 Drawing Sheets

(56) References Cited

OTHER PUBLICATIONS

Moraga et al., Cooling Li-ion batteries of racing solar car by using multiple phase change materials, Applied Thermal Engineering, vol. 108, pp. 1041-1054, Published Jul. 29, 2016.
Ianniciello et al., Electric vehicles batteries thermal management systems employing phase change materials, Journal of Power Sources, vol. 378, pp. 383-403, 2018.

* cited by examiner

US 11,374,273 B2

THERMAL MANAGEMENT SYSTEMS INCLUDING MULTIPLE PHASE CHANGING MATERIALS AND VEHICLES INCLUDING THE SAME

TECHNICAL FIELD

The present specification generally relates to thermal management systems for electric batteries, and more specifically, to thermal management systems for electric batteries including multiple phase change materials.

BACKGROUND

Electric batteries may generate waste heat as they convert chemical energy to electrical energy. This waste heat can be transferred to a heat exchanger and rejected to the atmosphere to cool the electric battery. Batteries that power electric vehicles may be subject to large variations in battery use and battery use rate based on driving behavior and conditions. Large variations in battery use and battery use rate require a heat exchanger with a robust heat absorption capability that is able to absorb heat from the battery at low use rates and at high use rates for an extended period of time. Thus, effective thermal management system for removing heat from batteries may be desired.

SUMMARY

In one embodiment, a battery module includes a battery cell and a thermal management system for removing heat from the battery cell. The thermal management system includes two or more unit cells in an array. Each unit cell includes a primary shell comprising a primary phase change material (PCM), and a secondary shell comprising a secondary PCM that is thermally coupled to the primary shell. The battery cell is thermally coupled to the primary shell at a heat transfer interface and the secondary shells of adjacent unit cells in the array are separate.

In another embodiment, a unit cell for a thermal management system for removing heat from a battery module includes a primary shell comprising a primary PCM, a secondary shell comprising a secondary PCM that is thermally coupled to the primary shell via a heat bridge, and a battery cell that is thermally coupled to the primary shell at a heat transfer interface.

In yet another embodiment, a vehicle includes a battery module that includes a battery cell and a thermal management system for removing heat from the battery cell. The thermal management system includes two or more unit cells in an array. Each unit cell includes a primary shell comprising a primary phase change PCM and a secondary shell comprising a secondary PCM that is thermally coupled to the primary shell via a heat bridge. The battery cell is thermally coupled to the primary shell at a heat transfer interface and the secondary shells of adjacent unit cells in the array are separate.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
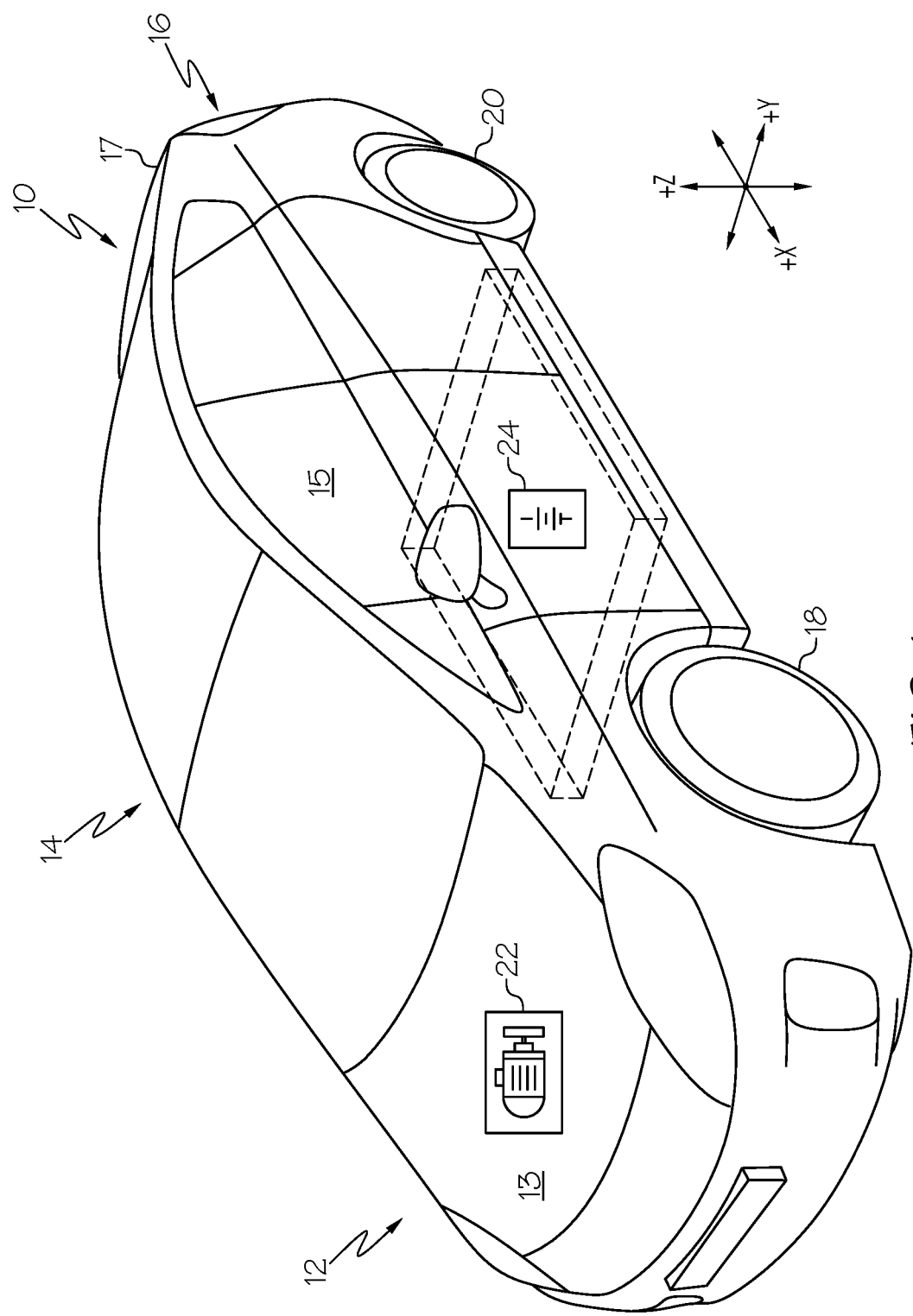
FIG. 1 depicts a vehicle including a battery module and a thermal management system according to one or more embodiments shown and described herein.

Electric vehicles may include one or more batteries that store chemical energy in one or more battery cells and transform the stored chemical energy to electrical energy on demand to power one or more systems of the electric vehicle (e.g., an electric drive motor). As used herein, the term "battery" refers to any type of electrochemical energy store that includes one or more chemical reactants configured to react with an external reactant in an electrochemical reaction to produce an electric potential. This transformation of chemical energy to electrical energy may generate waste heat.

A plurality of battery cells may be configured in series, in parallel, or some combination of the two to power the drive mechanisms and other systems of electric vehicles. Batteries used to power electric vehicles and other similar applications pose particular challenges due to the size and weight of vehicles and the requirement for interoperability with other systems. Moreover, batteries in electrified vehicles (e.g., hybrid electric vehicles, plug-in hybrid electric vehicles and electric vehicles (collectively, "electric vehicle" or "electric vehicles")) are generally designed to be as small as possible and therefore may require dense power generation capabilities. Because batteries generate waste heat as they operate, dense power generation results in dense heat generation. Waste heat must be removed from the battery for proper sustained operation.

Batteries may be cooled using an active cooling heat exchanger. Active cooling heat exchangers may include heat exchangers with one or more cooling fluids (e.g., air) that may be forced over an external surface of one or more battery cells. However, the use of active cooling introduces complexity (e.g., space considerations) and active cooling measures alone may not be the most efficient method for cooling a battery. Additionally, active cooling heat exchangers may not have sufficient heat removal capacity to absorb and reject the quantities of heat generated by the batteries.

Moreover, differences in heat generation, flux, and cooling requirements may exist between the various cells in a battery. For example, in batteries including an air channel, the battery cells nearest an air inlet may receive cooler air than the battery cells near an air outlet because the air may heat up as it flows over the batteries nearer the inlet. Additionally, the temperature of any particular battery cell may be higher on average near the center of a cell rather than at the extremities where waste heat may be rejected to external systems. Further, the impedance distribution between cells or groups of cells may vary and this variation may cause temperature variations. Moreover, variations in impedance distribution may be amplified as temperatures increase in the battery during battery use. Accordingly, a thermal management system incorporating passive heat transfer mechanisms in addition to active cooling may be required.

Phase change materials (PCM) generally have a high heat of fusion and are capable of storing and releasing large amounts of energy. PCMs absorb heat as they change from a solid to a liquid (i.e., melt) and release heat as they change from a liquid to a solid (i.e., solidify). The amount of heat absorbed or released during this process is referred to as the latent heat of fusion.

Certain PCMs may have between 5 and 14 times the specific heat capacity as water. Moreover, PCMs have several advantageous characteristics in a vehicle context. For example, PCMs solidify without much undercooling, meaning that ambient air may suffice in many cases to solidify the PCM. Additionally, many PCMs are compatible with conventional construction materials that are compatible with vehicle construction. Further, some PCMs are generally chemically stable, non-reactive, and recyclable.

Embodiments of the present disclosure include thermal management systems incorporating one or more PCMs that may extend the level and duration that a battery system can be used to power one or more electric systems. Accordingly, in an electrified vehicle context an electric vehicle can travel further, faster, and more comfortably from one place to another, enhancing a user experience.

The principles described herein can be embodied in a number of embodiments. The illustrative embodiment shown in FIG. 1 includes a vehicle 10 that includes a front section 12 including an engine bay 13, a middle section 14 including a cabin 15, and a rear section 16 including a trunk 17. Although embodiments are described in the context of electric vehicles, embodiments are not limited thereto. The thermal management systems described herein may be employed in any battery application. The vehicle 10 also includes front wheels 18 and rear wheels 20, either of which or both, may be driven by an electric drive motor 22. The electric drive motor 22 may be electrically coupled to and receive electric power from a battery module 24. The battery module 24 may include one or more battery cells that convert chemical energy into electrical energy as will be described in greater detail herein. While the vehicle 10 in the particular example embodiment shown in FIG. 1 is a sedan, it is to be understood that other embodiments of the vehicle 10 could take any body style, for example, a truck, a sport utility vehicle (SUV), a van, a coupe, etc.

Additionally, while the battery module 24 is shown in the middle section 14 and the electric drive motor 22 is shown in the engine bay 13 in the particular example embodiment shown in FIG. 1, the battery module 24 and/or the electric drive motor 22 could be positioned in any portion of the vehicle 10. For example, it is contemplated that the battery module 24 and/or the electric drive motor 22 may be positioned in the front section 12, the middle section 14, or the rear section 16 in any combination.

Figure 2A:
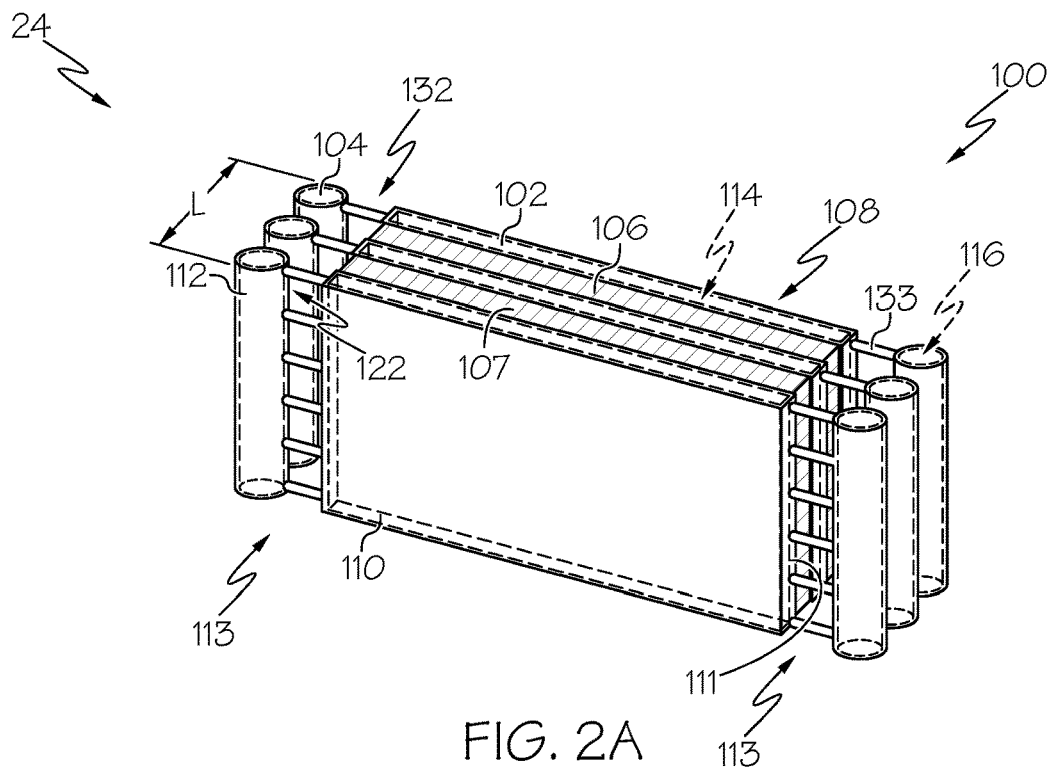
FIG. 2A depicts an illustrative embodiment of the thermal management system of the vehicle of FIG. 1 including a primary and a secondary phase change material according to one or more embodiments shown and described herein.
Figure 2B:
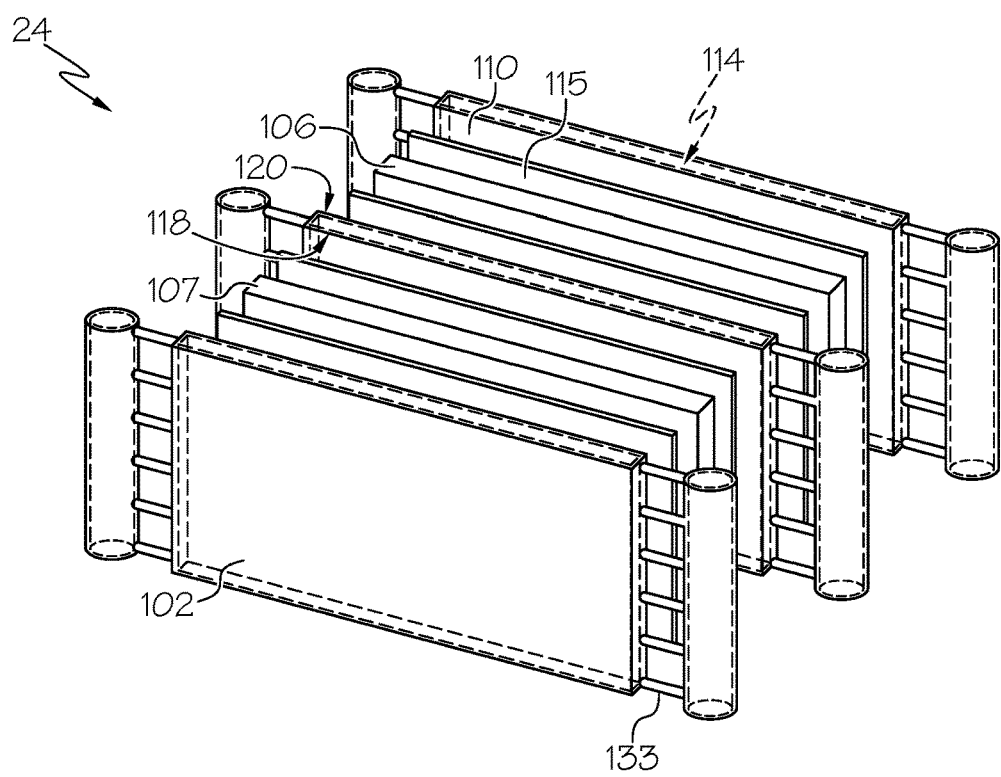
FIG. 2B depicts the thermal management system of FIG. 2A in an exploded view according to one or more embodiments shown and described herein.

FIGS. 2A and 2B depict one illustrative embodiment of a thermal management system 100 for cooling a battery module 24 that includes multiple PCMs. Specifically, the embodiment depicted in FIGS. 2A and 2B includes a unit cell 108 that may be a component of a larger battery module 24. The unit cell 108 may be constructed of a thermally conductive material, such as metal or a thermally conductive polymer. The thermal management system 100 includes a primary PCM 102 encapsulated in a primary shell 110 and a secondary PCM 104 encapsulated in a secondary shell 112 that extends from a sidewall 111 of the primary shell 110. The primary PCM 102 and the secondary PCM 104 are configured to absorb heat from a battery cell 106 disposed between adjacent primary PCM's 102 of the primary shells 110. The secondary shell 112 is mechanically coupled to the primary shell 110 at a first heat bridge 132 that is formed from one or more heat bridge arms 133. Embodiments are not limited to including heat bridge arms 133, and it is contemplated that any structure may be used to connect the primary shell 110 and the secondary shell 112, for example, a single solid plate. In some embodiments, at least a portion of the secondary shell 112 is exposed to air flow in a channel 113. In some embodiments, the air may be forced through the channel 113 by a fan, a jet, or by the structure of the vehicle 10 as it travels forward (e.g., a forced air intake).

The primary shell 110 may include a primary cavity 114 formed from two sets of opposing sidewalls that encapsulate the primary PCM 102. In some embodiments, the primary cavity 114 extends continuously across substantially an entire width of the primary shell 110, but embodiments are contemplated in which the primary cavity 114 does not extend the entire width or in which the primary cavity 114 extends across two or more discrete portions of the primary shell 110. In some embodiments, the primary cavity 114 extends an entire height of the primary shell 110, but embodiments are contemplated in which the primary cavity 114 does not extend the entire height of the primary shell 110 or in which the primary cavity 114 extends two or more discrete portions of the primary shell 110. As shown, the primary cavity 114 is substantially rectangular with flat internal walls, but embodiments are contemplated in which the internal and/or external surfaces of the cavity walls are textured (e.g., bumps, fins, waves, etc.), for example, to increase heat transfer characteristics. In some embodiments, one or more surfaces of the primary cavity 114 may be made from a porous structure, such as, for example, a metal foam (e.g., a closed-cell metal foam or an open-cell metal foam) or a metal inverse opal. In some embodiments, the primary cavity 114 may be filled primarily with a metal foam or metal inverse opal having a PCM (e.g., the primary PCM 102) filling one or more of the pores or other voids in the porous structure.

The secondary shell 112 may include at least one secondary cavity 116 that encapsulates the secondary PCM 104. In some embodiments, the secondary cavity 116 extends an entire height of the secondary shell 112, but embodiments are contemplated in which the secondary cavity 116 does not extend the entire height of the secondary shell 112 or in which the secondary cavity 116 extends two or more discrete portions of the height of the secondary shell 112. In embodiments of the thermal management system 100 having more than one secondary shell 112, the secondary shells 112 are separate shells. In some embodiments, one or more surfaces of the secondary cavity 116 may be made from a porous structure, such as, for example, a metal foam (e.g., a closed-cell metal foam or an open-cell metal foam) or a metal inverse opal. In some embodiments, the secondary cavity 116 may be filled primarily with a metal foam or metal inverse opal having a PCM (e.g., the secondary PCM 104) filling one or more of the pores or other voids in the porous structure.

In some embodiments, the primary shell 110 may be made from a material with high electrical resistivity and high thermal conductivity. Because of the high electrical resistivity, the primary shell 110 may electrically insulate each of the battery cells 106 from the other battery cells 107 and from components external to the thermal management system 100, for example, electrically conductive components of an electric vehicle engine compartment. Because the primary shell 110 is thermally conductive, it may provide little resistance to the flow of heat from the battery cell 106 to the primary PCM 102. Additionally, in some embodiments, the primary shell 110 may be made from a material with a high thermal conductivity without regard for its electrical resistivity or passivity because a shim 115 (FIG. 2B) may be used to electrically isolate consecutive ones of the primary shells 110 and the shim 115 (FIG. 2B) may incorporate a high electrical resistivity.

The primary shell 110 may be isotropic or anisotropic. As non-limiting examples, the primary shell 110 may be made from multiple materials having various thermal transfer characteristics and/or the primary shell 110 may be made from a single material having various thermal transfer characteristics throughout the primary shell 110. In some embodiments, these properties may be engineered for effect. For example, anisotropic characteristics of the primary shells 110 may be engineered such that they channel heat away from the center of the primary shell 110 to the sides of the primary shell 110. Such anisotropic characteristics may, for example, channel heat away from the center of the battery cell 106 where there may be a higher heat flux than at the sides of the battery cell 106 where there may be a lower heat flux.

FIG. 2B depicts the example thermal management system 100 of FIG. 2A in an exploded view. As shown in FIG. 2B, in some embodiments, the shim 115 is disposed between the battery cell 106 and one or more of the primary shell 110 and the secondary shell 112 to prevent current from flowing between the battery cell 106 and the primary shell 110 and/or the secondary shell 112.

Referring to both FIGS. 2A and 2B, the primary PCM 102 may be thermally coupled to the battery cell 106 at a first face 120 of the primary shell 110. The first face 120 of the primary shell 110 may be a generally planar surface forming a thermal transfer interface with the battery cell 106. In some embodiments, the primary PCM 102 may also be thermally coupled to a second battery cell 107 along a second face 118 (i.e., the opposite face as the first face 120) of the primary shell 110. The second face 118 may be a generally planar surface forming a thermal transfer interface with the battery cell 106. Although the particular embodiment depicted in FIGS. 2A and 2B includes three primary shells 110, three sets of secondary shells 112, and two battery cells 106, 107 the pattern of battery cells 106, 107 in between primary shells 110 may be repeated continuously within the thermal management system 100 as desired. One or more of the first face 120 and the second face 118 may be made from an electrically insulating material. For example, the first face 120 and/or the second face 118 may be made from an electrically insulating polymer, a ceramic, quartz, or the like. Accordingly, the primary shell 110 may electrically isolate the battery cells 106, 107 individually from one another along a length L of the thermal management system 100 and absorb the waste heat generated by the battery cell 106 through both the first face 120 and the second face 118. In other embodiments, one or more of the first face 120 and the second face 118 may be made from a metal that is electrically conductive and the shim 115 may electrically isolate one or more of the first face 120 and the second face 118.

The thermal properties of the secondary shell 112 may be isotropic or anisotropic. As non-limiting examples, the secondary shell 112 may be made from multiple materials having various thermal transfer characteristics and/or the secondary shell 112 may be made from a single material having various thermal transfer characteristics throughout the secondary shell 112. In some embodiments, these properties may be engineered for effect. For example, the anisotropic characteristics of the secondary shell 112 may be engineered such that they channel heat away from one portion of the secondary shell 112 to another portion of the secondary shell 112. Such anisotropic characteristics may, for example, remove heat from the center of the proximal face 122 where there may be a higher heat flux than at the sides of the proximal face 122 where there may be a lower heat flux. In some embodiments, the secondary shell 112 may be constructed of the same materials as the primary shell 110.

The first heat bridge 132 may couple the primary shell 110 with the secondary shell 112 at a proximal face 122 of the secondary shell 112. In the particular embodiment shown in FIGS. 2A and 2B, the first heat bridge 132 is formed by the one or more heat bridge arms 133 that form one or more air gaps in the channel 113 between neighboring heat bridge arms 133. As depicted in FIGS. 2A and 2B, the secondary shell 112 may generally take the shape of a cylinder with a curve in the proximal face 122. However, the secondary shell 112 may take different volumetric shapes. For example, the secondary shell 112 could be an orthotope, a triangular prism, or some other shape. The secondary PCM 104 may be indirectly thermally coupled to the battery cell 106 through the primary shell 110 at the first heat bridge 132.

The battery cell 106 is a battery that transforms chemical energy to electrical energy. Non-limiting examples of batteries include Li-ion batteries, lead acid batteries, such as PbSO$_4$ batteries, and other chemical batteries. In some embodiments, a series of battery cells 106 are electrically connected to form the battery module 24. Additionally, each battery cell 106 may be individually or collectively electrically coupled to one or more systems external to the thermal management system 100 (e.g., one or more systems of an electric vehicle). The battery cell 106 may generate waste heat as it converts chemical energy to electrical energy to provide electrical power to one or more external systems. The battery cells 106 may be sandwiched between unit cells 108 to form an array making up the battery module 24.

Figure 4:
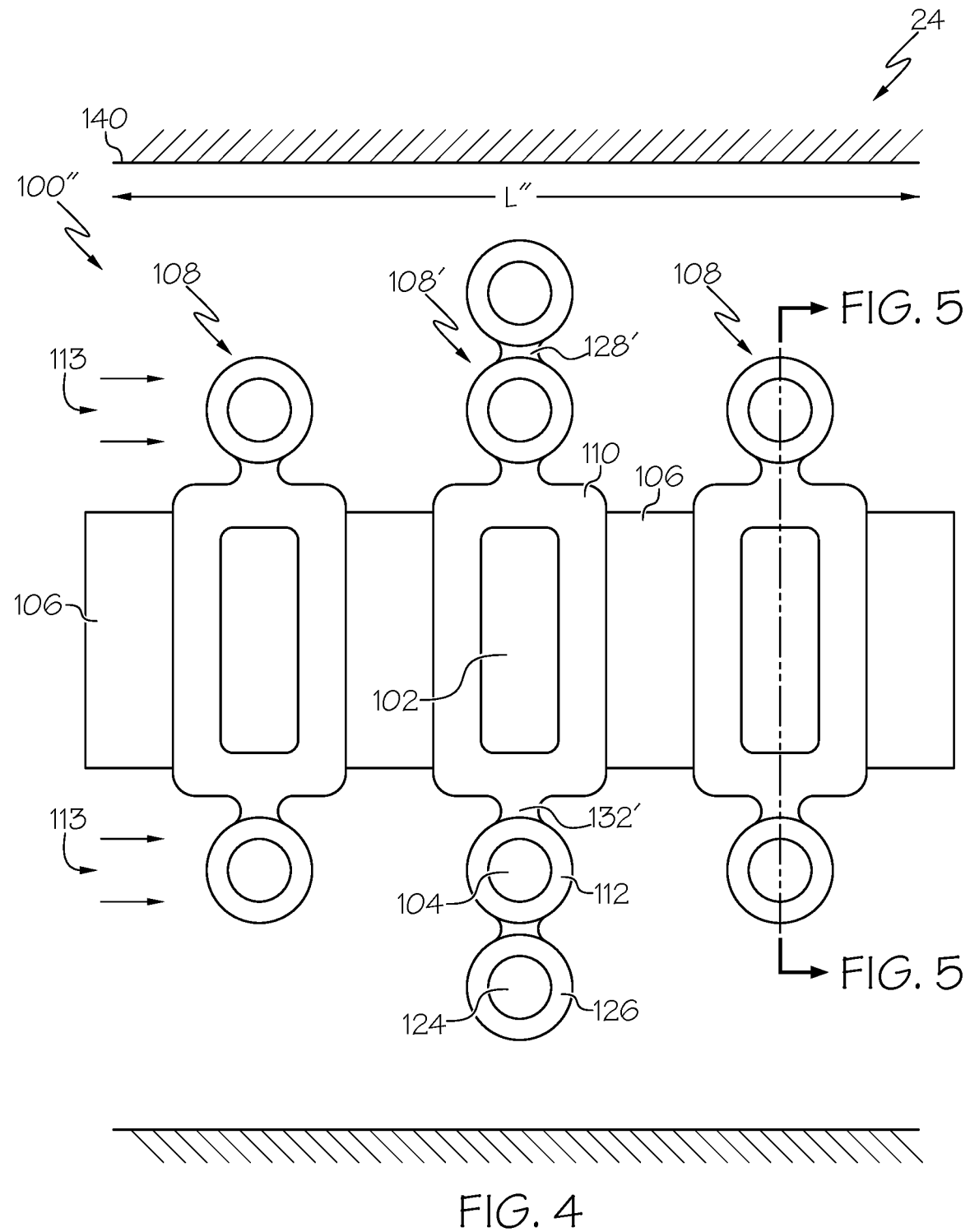
FIG. 4 depicts another illustrative embodiment of the thermal management system for the vehicle of FIG. 1 according to one or more embodiments shown and described herein.

Heat transfers from the battery cell 106 to through the primary shell 110 to the primary PCM 102 and then conducts across the one or more heat bridge arms 133 to the secondary shell 112 where it conducts to the secondary PCM 104. Additionally, heat is transferred to the air flowing through the channel 113 through the heat bridge arms 133. Embodiments are contemplated in which the first heat bridge 132 takes a different form. For example, with brief reference to FIG. 5, which depicts a cross sectional view of another embodiment of the thermal management system 100"

depicted in FIG. 4, the first heat bridge 132 may be a solid wall in between the secondary shell 112 and the primary shell 110.

Still referring to FIGS. 2A and 2B, in some embodiments the heat transfer characteristics of the first heat bridges 132 in each of the unit cells 108 are equivalent. That is, given a constant heat flux from the primary PCM 102 to the secondary PCM 104, heat will transfer at the same rate across each of the first heat bridges 132. In other embodiments, the thermal properties of the first heat bridges 132 may vary. For example, the thermal properties of the first heat bridges 132 may vary along the length L of the battery module 24. For example, the first heat bridges 132 at the back of a battery module 24 (with respect to the direction of air flow through the channel 113) may be more thermally conductive than the first heat bridges 132 near the front of the battery module 24. This may reduce resistance to heat transfer from the primary PCM 102 to the secondary PCM 104 in areas of the battery module 24 where the air flowing through the channel 113 may be hotter. In other embodiments, the first heat bridges 132 at the front of a battery module 24 (with respect to the direction of air flow through the channel 113) may be more thermally conductive than the first heat bridges 132 near the back of the battery module 24. This may reduce resistance to heat transfer from the primary PCM 102 to the secondary PCM 104 in areas of the battery module 24 where the air flowing through the channel 113 may be cooler.

The thermal properties of the primary PCM 102 may vary along the length L of the thermal management system 100. As used herein, the term "primary PCM" is used to refer to the PCM that is in the primary cavity 114, and not meant to limit the PCM in each of the primary cavities 114 to any particular material. Rather, embodiments are considered in which the PCM in each of the primary cavities 114 may be the same material or composition of materials and embodiments are considered in which the PCM in each of the primary cavities 114 may be different materials or compositions of materials.

The primary PCM 102 in each primary cavity 114 may be selected based on its melting temperature. For example, the primary PCM 102 may be selected to have a melting temperature below the maximum design temperature of the battery cell 106. In some embodiments, the primary PCM 102 is selected to have a melting temperature below the melting temperature of the secondary PCM 104. In other embodiments, the primary PCM 102 is selected to have a melting temperature above the melting temperature of the secondary PCM 104. In some embodiments, the primary PCM 102 in each of the primary cavities 114 has the same melting temperature. In some embodiments, the melting temperature of the primary PCM 102 may vary between different unit cells 108. Non-limiting examples of PCMs include paraffin, polyethylene glycols, clathrates, salthydrates, sugar alcohols, water, and water-salt mixtures. In some embodiments, the PCM may be a hybrid PCM, that includes one or more other constituents. For example, and without limitation, the PCM may be a graphene paraffin composite, a graphite paraffin composite, or a graphite paraffin nickel composite.

As used herein, the term "secondary PCM" is used to refer to the PCM that is in the secondary cavity 116, and not meant to limit the PCM in each of the secondary cavities 116 to any particular material. Rather, embodiments are considered in which the PCM in each of the secondary cavities 116 may be the same material or composition of materials and embodiments are considered in which the PCM in each of the secondary cavities 116 may be different materials or compositions of materials. The secondary PCM 104 may be selected based on its melting temperature. For example, the secondary PCM 104 may be selected to have a melting temperature below the maximum design temperature of the battery cell 106. In some embodiments, the secondary PCM 104 is selected to have a melting temperature below the temperature of the air flowing through the channel 113 and above or below the melting temperature of the primary PCM 102. In some embodiments, the secondary PCM 104 in each of the secondary cavities 116 has the same melting temperature. In some embodiments, the melting temperature of the secondary PCM 104 may vary between different unit cells 108.

Figure 3:
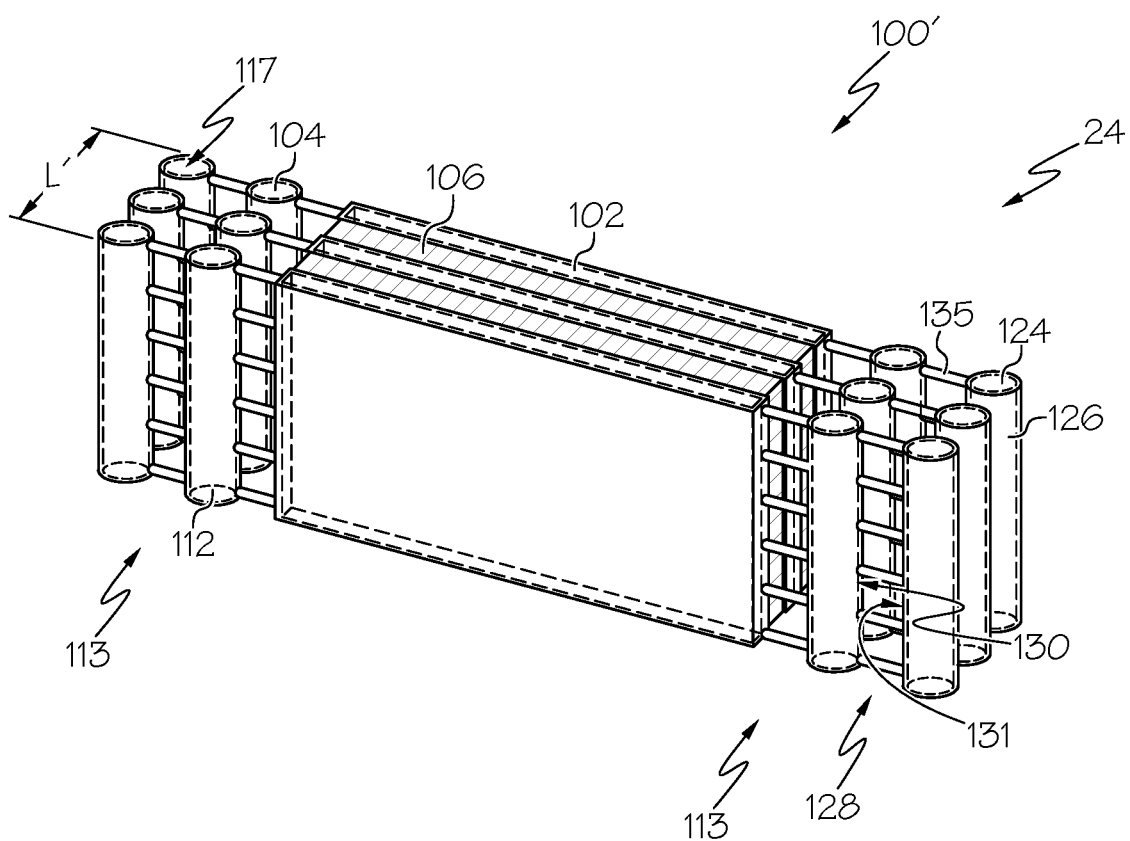
FIG. 3 depicts the thermal management system of FIG. 2A further including a tertiary phase change material according to one or more embodiments shown and described herein.

Referring now to FIG. 3, another thermal management system 100' includes a tertiary PCM 124 encapsulated in a tertiary shell 126. The tertiary shell 126 may be thermally coupled to the secondary shell 112 via a second heat bridge 128 extending between a distal face 130 of the secondary shell 112 and a proximal face 131 of the tertiary shell 126.

The second heat bridge 128 is formed by a plurality of heat bridge arms 135. In some embodiments the heat transfer characteristics of the second heat bridges 128 in each of the unit cells 108 are equivalent. That is, given a constant heat flux from the secondary PCM 104 to the tertiary PCM 124, heat will transfer at the same rate across each of the second heat bridges 128. In other embodiments, the thermal properties of the second heat bridges 128 may vary. For example, the thermal properties of the second heat bridges 128 may vary along a length L' of the battery module 24. For example, the second heat bridges 128 at the back of a battery module 24 (with respect to the direction of air flow through the channel 113) may be more thermally conductive than the second heat bridges 128 near the front of the battery module 24. This may reduce resistance to heat transfer from the secondary PCM 104 to the tertiary PCM 124 in areas of the battery module 24 where the air flowing through the channel 113 may be hotter. In other embodiments, the second heat bridges 128 at the front of the battery module 24 (with respect to the direction of air flow through the channel 113) may be more thermally conductive than the second heat bridges 128 near the back of the battery module 24. This may reduce resistance to heat transfer from the secondary PCM 104 to the tertiary PCM 124 in areas of the battery module 24 where the air flowing through the channel 113 may be cooler.

As used herein, the term "tertiary PCM" is used to refer to the PCM that is in the tertiary cavity 117, and not meant to limit the PCM in each of the tertiary cavities 117 to any particular material. Rather, embodiments are considered in which the PCM in each of the tertiary cavities 117 may be the same material or composition of materials and embodiments are considered in which the PCM in each of the tertiary cavities 117 may be different materials or compositions of materials. The tertiary PCM 124 may be selected based on its melting temperature. For example, the tertiary PCM 124 may be selected to have a melting temperature below the maximum operating temperature of the battery cell 106. In some embodiments, the tertiary PCM 124 is selected to have a melting temperature above the temperature of the air flowing through the channel 113 and above or below the melting temperature of the primary PCM 102 and/or the secondary PCM 104. In some embodiments, the tertiary PCM 124 in each of the tertiary cavities 117 has the same melting temperature. In some embodiments, the melting temperature of the tertiary PCM 124 may vary between different unit cells 108.

The tertiary shell 126 may be isotropic or anisotropic. As non-limiting examples, the tertiary shell 126 may be made from multiple materials having various thermal transfer characteristics and/or the tertiary shell 126 may be made from a single material having various thermal transfer characteristics throughout the tertiary shell 126. In some embodiments, these properties may be engineered for desired heat flow. For example, the anisotropic characteristics of the tertiary shell 126 may be engineered such that they channel heat away from the center of the tertiary shell 126 to the sides of the tertiary shell 126. Such anisotropic characteristics may, for example, remove heat from one portion of the proximal face 131 where there may be a higher heat flux than at another portion of the proximal face 131 where there may be a lower heat flux.

The tertiary shell 126 may include at least one tertiary cavity 117 that encapsulates the tertiary PCM 124. In some embodiments, the tertiary cavity 117 extends an entire height of the tertiary shell 126, but embodiments are contemplated in which the tertiary cavity 117 does not extend the entire height of the tertiary shell 126 or in which the tertiary cavity 117 extends two or more discrete portions of the height of the tertiary shell 126. In embodiments of the thermal management system 100 having more than one tertiary shell 126, the tertiary shells 126 are separate shells. In some embodiments, one or more surfaces of the tertiary cavity 117 may be made from a porous structure, such as, for example, a metal foam (e.g., a closed-cell metal foam or an open-cell metal foam) or a metal inverse opal. In some embodiments, the tertiary cavity 117 may be filled primarily with a metal foam or metal inverse opal having a PCM (e.g., the tertiary PCM 124) filling one or more of the pores or other voids in the porous structure.

Figure 5:
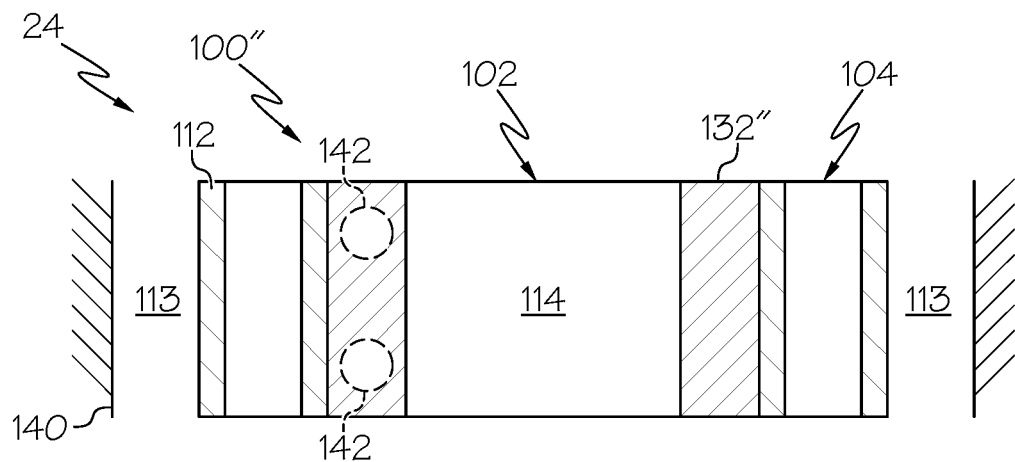
FIG. 5 depicts a side cross-sectional view of the thermal management system of FIG. 4 according to one or more embodiments shown and described herein.

FIG. 4 shows another example thermal management system 100" including the primary PCM 102 and the secondary PCM 104 connected by the first heat bridge 132' and the tertiary PCM 124 connected to the secondary PCM 104 by the second heat bridge 128'. FIG. 5 illustrates a cross sectional view of the thermal management system 100" cut along the dashed line in FIG. 4. The cross section of FIG. 5 shows the secondary shell 112 extending into the channel 113 between the secondary shell 112 and an outer casing 140. The outer casing 140 may be a housing for the battery module 24 and may include one or more air direction and/or filtration features such as fins, fans, filters, and the like.

Referring to FIGS. 4 and 5, one or more of the first heat bridge 132' and the second heat bridge 128' may be flat walls without features for directing airflow such as the first heat bridge 132' depicted on the right side of FIG. 5. As shown in FIGS. 4 and 5, the first heat bridge 132' and the second heat bridge 128' may be flat walls (i.e., without the heat bridge arms 133 shown in FIGS. 2A-3). However, in some embodiments, one or more of the first heat bridge 132' and the second heat bridge 128' may include features 142 for directing air flowing through the channel 113 into contact with portions of the thermal management system 100". For example, the features 142 may be circular apertures passing through a thickness of the first heat bridge 132'. The features 142 may direct air through portions of the first heat bridge 132' and the second heat bridge 128' such that air flows between the primary shell 110 and the secondary shell 112 and between the secondary shell 112 and the tertiary shell 126. The features 142 may reduce resistance to air flow and/or direct the air flowing through the channel 113 and may increase heat transfer from the battery cell 106 to the air flowing through the channel 113. Although the features 142 shown in FIG. 5 are apertures through the first heat bridge 132', it is contemplated that the features 142 could take another form, for example, the features 142 could be one or more fins, tubes, bumps, etc. In some embodiments, the battery cells 106 and primary cavities 114 may include features similar to the features 142 for increasing the flow of air through the battery module 24. And in some embodiments, referring to the FIGS. generally, air may flow through one or more of the first heat bridge 132, the second heat bridge 128, the primary cavity 114, and the battery cell 106 along a length of the battery module 24 removing heat directly from the battery cell 106 and the primary PCM 102.

In general, the primary PCM, the secondary PCM, and the tertiary PCM may be chosen based on their relative latent heats of fusion (LHF) and other characteristics. For example, the primary PCM and the secondary PCM may be selected based on one or more of a melting temperature in the desired operating temperature range; a latent heat of fusion per unit volume; a specific heat, a density and a thermal conductivity; a size of volume change at phase transformation; one or more kinetic properties (e.g., viscosity); a nucleation rate (e.g., to avoid supercooling in the liquid phase); a rate of crystal growth. As such, it should be appreciated that a heat per unit volume capacity of the primary PCM may vary along a length of the array. Such that the heat per unit volume capacity of the primary PCM increases or decreases along the length of the array. Further, a heat per unit volume capacity of the secondary PCM may vary along a length of the array such that the heat per unit volume capacity of the secondary PCM increases or decreases along the length of the array.

Figure 6:
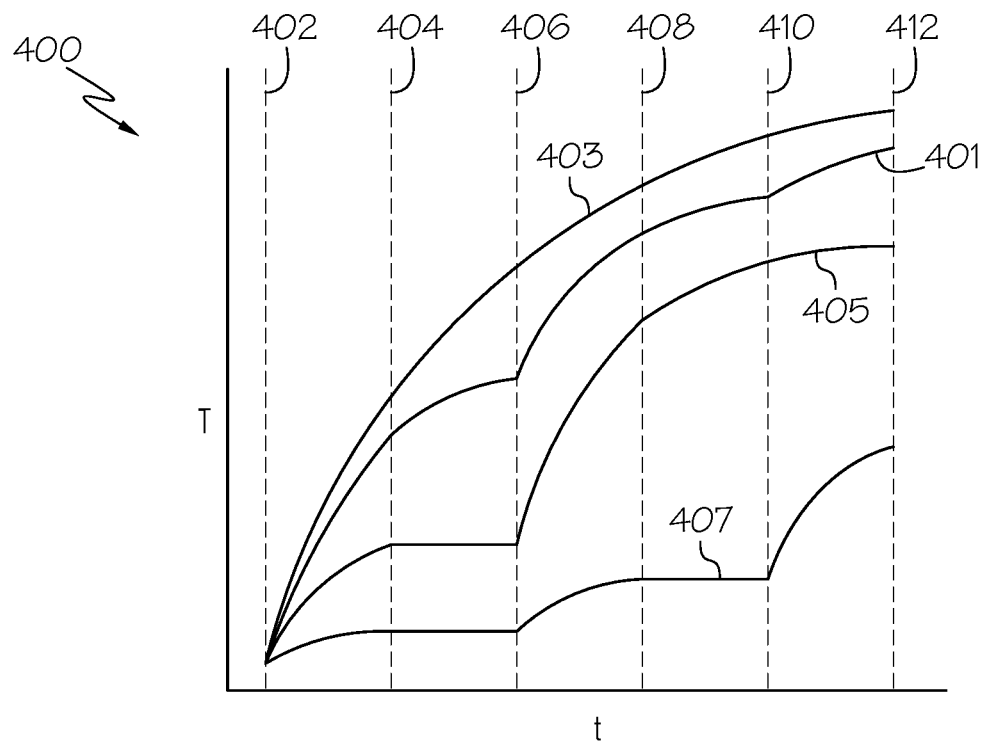
FIG. 6 depicts a chart comparing the temperature rise between two battery cells, one including a thermal management system and the other not, according to one or more embodiments shown and described herein.

Referring now to FIGS. 1 and 6, operation of the thermal management system 100 within the battery module 24 is described. For the purposes of the description of the chart shown in FIG. 6, a thermal management system including a primary PCM that is in thermal communication with a secondary PCM is shown. The primary PCM in this hypothetical illustrative embodiment has a lower melting temperature than the secondary PCM. FIG. 6 shows a chart 400 depicting an internal temperature of the battery cell 106 of FIG. 2A as the battery cell 106 generates waste heat as a driver of the vehicle 10 of FIG. 1 accelerates the vehicle 10. Referring to FIG. 6, the chart 400 shows temperature T v. time t, assuming a constant heat flux from a battery cell. Curve 401 shows the internal temperature of a battery cell, such as the battery cell 106 of FIG. 2A as the battery converts chemical energy to electrical energy and generates waste heat. Curve 403 shows a comparable battery cell without a thermal management system such as the thermal management system 100 of FIG. 2A. The battery cell begins to produce electrical energy at point 402 to send electrical energy from the battery module to the drive motor. Accordingly, the internal temperature of the cell begins to rise. As the battery cell temperature increases, the waste heat generated by the battery cell conducts to the primary PCM and from the primary PCM to the secondary PCM. The temperature of the primary PCM is shown by line 405. The temperature of the secondary PCM is shown by line 407. The temperature of the battery cell continues to rise as it produces electrical energy. Heat from the battery cell continues to flow to the primary PCM until the temperature reaches the LHF for the particular material that is chosen for the primary PCM at point 404.

Once the primary PCM reaches its LHF (the primary LHF), it absorbs heat from the battery cell without a significant change in temperature (i.e., at a constant temperature) until the primary PCM is transformed to the liquid phase at point 406. Because the temperature of the primary PCM does not continue to increase while it is absorbing the latent heat of fusion from the battery cell, there is not an appreciable change in the temperature difference between the primary PCM and the secondary PCM so the increase in temperature of the secondary PCM may slow while the primary PCM melts (i.e., between points 404 and 406). Once the primary PCM has absorbed the primary LHF from the battery, the temperature of the primary PCM begins to increase again at point 406.

The liquid phase of the primary PCM has a higher internal energy than the solid phase and heat continues to transfer from the primary PCM to the secondary PCM. The difference in temperature between the primary PCM and the secondary PCM rises once the primary PCM melts and the temperature of the secondary PCM rises more quickly until the temperature of the secondary PCM reaches its LHF at point 408 (the secondary LHF).

The secondary PCM absorbs heat from the primary PCM without a significant change in temperature (i.e., at a constant temperature) until the secondary PCM is transformed to the liquid phase at point 410. At point 412, the user of the vehicle 10 of FIG. 1 ends the acceleration and the temperature of the battery cell begins to level off. As can be seen by the difference in the maximum temperature between curve 401 and curve 403, the temperature of a battery cell 106 that is in thermal communication with a thermal management system such as the thermal management system 100 of FIG. 2A is lower at the end of an operational cycle of the battery module 24.

After the battery has completed a cycle and begins to cool (e.g., after an electrified vehicle has come to a stop and the vehicle is turned off), the battery cells may cool more quickly than the various PCMs. Accordingly, the PCMs may continue to warm the battery before the next start of the electrified vehicle. That is, if one or more cells of the battery module 24 (FIG. 1) stop converting chemical energy to electrical energy, and thus begin to cool below a temperature of the PCM, the PCM in thermal communication with the battery cell will warm the battery until the temperature of the PCM equals the battery cell temperature or the battery cell begins to operate again and the battery cell temperature increases above the PCM temperature. In the latter case, heat transferring from the PCM to the battery cell as the battery cell cools will reduce the temperature rise experienced by the battery cell upon its subsequent start (i.e., increase the cold start temperature), thus reducing negative effects associated with large, rapid temperature changes and prolonging the life of the battery cell.

It should now be understood that a thermal management system for a battery module may include one or more phase change materials. The one or more phase change materials may remove waste heat from one or more battery cells. The one or more phase change materials and the one or more battery cells may be arranged in an array of unit cells. Heat may transfer from individual battery cells to a primary PCM in a primary shell that is thermally coupled to the battery cell. Heat may transfer from the primary PCM to a secondary PCM in thermal communication with the primary PCM. PCMs may be capable of absorbing relatively large quantities of heat from the battery cell, thereby reducing the operational temperature of the battery cell. This may increase the quantity of electrical energy that can be produced by the battery cell and may extend the operational life of the battery cell. In one potential embodiment, the array of unit cells may be arranged into a battery module for powering one or more systems of an electric vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A battery module comprising:
a battery cell; and
a thermal management system for removing heat from the battery cell comprising:
two or more unit cells in an array, each individual unit cell comprising:
a primary shell, each individual primary shell comprising:
a pair of opposing sidewalls,
a primary cavity formed between the pair of opposing sidewalls, and
a primary phase change material (PCM),
wherein the primary cavity fully encapsulates the PCM, and
a heat bridge having a plurality of heat bridge arms, and
a secondary shell comprising a secondary PCM that is thermally coupled to the primary shell,
wherein:
the heat bridge extends between one of the pair of opposing sidewalls of the primary shell and the secondary shell such that the secondary shell is spaced apart from the primary shell by the heat bridge, and
the battery cell is thermally coupled to the primary shell at a heat transfer interface and the secondary shells of adjacent unit cells in the array are separate from the primary shell and the heat transfer interface.

2. The thermal management system of claim 1, wherein the primary PCM has a lower melting temperature than the secondary PCM.

3. The thermal management system of claim 1, wherein the secondary PCM has a lower melting temperature than the primary PCM.

4. The thermal management system of claim 1, wherein the heat per unit volume capacity of the primary PCM varies along a length of the array.

5. The thermal management system of claim 4, wherein the heat per unit volume capacity of the primary PCM increases along the length of the array.

6. The thermal management system of claim 1, wherein the heat per unit volume capacity of the secondary PCM varies along a length of the array.

7. The thermal management system of claim 6, wherein the heat per unit volume capacity of the secondary PCM increases along the length of the array.

8. The thermal management system of claim 1, wherein the battery cell is indirectly thermally coupled to the secondary shell.

9. The thermal management system of claim 1, wherein the secondary shell comprises a secondary cavity and the primary shell is thermally coupled to at least two separate secondary cavities via the heat bridge.

10. The thermal management system of claim 1, wherein the secondary shell is thermally coupled to the primary shell by the heat bridge.

11. The thermal management system of claim 10, wherein the heat bridge comprises one or more air gaps that allow air to pass between the primary shell and the secondary shell.

12. The thermal management system of claim 1, further comprising a shim between the primary shell and the battery cell that electrically insulates the primary shell and the battery cell.

13. A unit cell for a thermal management system for removing heat from a battery module, the unit cell comprising:
 a primary shell having a sidewall and comprising a primary PCM that is fully encapsulated within the primary shell;
 a secondary shell comprising a proximal face and a secondary PCM, the proximal face of the secondary shell is spaced apart from the sidewall of the primary shell to form an air gap and thermally coupled to the primary shell via a heat bridge, the heat bridge having a plurality of heat bridge arms that extend between the sidewall of the primary shell and the proximal face of the secondary shell such that the secondary shell is spaced apart from the primary shell by the heat bridge; and
 a battery cell that is thermally coupled to the primary shell at a heat transfer interface, wherein the heat bridge and the air gap of the secondary shell is separated from an adjacent battery cell and each individual unit cell has an individual primary shell and secondary shells separated from the adjacent battery cell.

14. The unit cell of claim 13, wherein:
 the primary shell comprises a primary cavity that is filled with a metal foam having one or more pores filled with the primary PCM.

15. The unit cell of claim 13, wherein:
 the secondary shell comprises a secondary cavity that is filled with a metal foam having one or more pores filled with the secondary PCM.

16. A vehicle including a battery module, the battery module comprising:
 a battery cell; and
 a thermal management system for removing heat from the battery cell comprising:
  two or more unit cells in an array, each individual unit cell comprising:
   a primary shell, each individual primary shell comprising:
    a pair of opposing sidewalls,
    a primary cavity formed between the pair of opposing sidewalls, and
    a primary phase change material (PCM),
    wherein the primary cavity fully encapsulates the PCM, and
   a secondary shell comprising a secondary PCM that is thermally coupled to the primary shell via a heat bridge,
  wherein:
   the heat bridge having a plurality of heat bridge arms, the heat bridge extends between one of the pair of opposing sidewalls of the primary shell and the secondary shell such that the secondary shell is spaced apart from the primary shell by the heat bridge, and
   the battery cell is thermally coupled to the primary shell at a heat transfer interface and the secondary shells of adjacent unit cells in the array are separate from the primary shell and the heat transfer interface.

17. The vehicle of claim 16, wherein the heat transfer interface comprises an electrically insulating material.

18. The vehicle of claim 16, wherein the thermal management system further comprises a shim between the primary shell and the battery cell that electrically insulates the primary shell and the battery cell.

19. The vehicle of claim 16, wherein the heat per unit volume capacity of the primary PCM varies along a length of the array.

20. The vehicle of claim 16, wherein the heat per unit volume capacity of the secondary PCM varies along a length of the array.

* * * * *